US 9,625,696 B2

(12) United States Patent
Hashimoto et al.

(10) Patent No.: US 9,625,696 B2
(45) Date of Patent: Apr. 18, 2017

(54) LASER MICROSCOPE WHICH EXPANDS THE DYNAMIC RANGE OF AN INTENSITY SIGNAL AND SUPPRESSES DEGRADATION OF A LIGHT DETECTING PORTION

(71) Applicant: OLYMPUS CORPORATION, Shibuya-ku, Tokyo (JP)

(72) Inventors: Katsuyuki Hashimoto, Tokyo (JP); Kunihiko Sasaki, Tokyo (JP); Yasunari Matsukawa, Saitama (JP); Akinori Araya, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/880,466

(22) Filed: Oct. 12, 2015

(65) Prior Publication Data

US 2016/0109694 A1    Apr. 21, 2016

(30) Foreign Application Priority Data

Oct. 17, 2014    (JP) ................ 2014-212732

(51) Int. Cl.
*G02B 21/06* (2006.01)
*G02B 21/36* (2006.01)
*G02B 21/00* (2006.01)
*G02B 21/16* (2006.01)

(52) U.S. Cl.
CPC ......... *G02B 21/365* (2013.01); *G02B 21/002* (2013.01); *G02B 21/008* (2013.01);
(Continued)

(58) Field of Classification Search
CPC .. G02B 21/00; G02B 21/0004; G02B 21/002; G02B 21/0024; G02B 21/0028;
(Continued)

(56) References Cited

U.S. PATENT DOCUMENTS

| 5,945,669 A | 8/1999 | Arai |
| 6,747,737 B2 * | 6/2004 | Wolleschensky ...... G02B 21/06 356/326 |

(Continued)

FOREIGN PATENT DOCUMENTS

| JP | 2014145959 A | 8/2014 |
| JP | EP 3009872 A2 * | 4/2016 ........... G02B 21/002 |

(Continued)

OTHER PUBLICATIONS

Partial European Search Report dated Feb. 25, 2016, issued in counterpart European Application No. 15189528.1.
Johnson, "Not seeing is not believing: improving the visibility of your fluorescence images", Molecular Biology of the Cell, vol. 23, No. 5, Feb. 29, 2012, pp. 754-757.

*Primary Examiner* — Arnel C Lavarias
(74) *Attorney, Agent, or Firm* — Holtz, Holtz & Volek PC

(57) ABSTRACT

A laser scanning microscope includes a light irradiating portion that irradiates a sample; a PMT that detects fluorescence from the sample and outputs an intensity signal; a data processing portion that converts the intensity signal to brightness information at each pixel; a full-scale setting portion that can set a normal full scale that is smaller than the intensity signal when a light stimulus is given and an expanded full scale that is larger than the normal full scale, as a maximum range of the intensity signal that can be converted to brightness information; and a control portion that determines whether to switch between a normal observation mode and a stimulation observation mode; wherein the full-scale switching portion sets the normal full scale in the normal observation mode and sets the expanded full scale in the stimulation observation mode.

10 Claims, 12 Drawing Sheets

(52) U.S. Cl.
CPC ......... *G02B 21/0076* (2013.01); *G02B 21/06* (2013.01); *G02B 21/16* (2013.01)

(58) Field of Classification Search
CPC ............ G02B 21/0032; G02B 21/0036; G02B 21/004; G02B 21/0044; G02B 21/0048; G02B 21/0052; G02B 21/006; G02B 21/0064; G02B 21/0072; G02B 21/0076; G02B 21/008; G02B 21/06
USPC ........ 359/385, 362, 363, 368, 369, 388, 389
See application file for complete search history.

(56) References Cited

U.S. PATENT DOCUMENTS

| | | | | |
|---|---|---|---|---|
| 7,297,921 | B2 * | 11/2007 | Watanabe | G02B 21/008 250/214 A |
| 7,781,711 | B2 * | 8/2010 | Fujita | G01N 21/6408 250/201.3 |
| 8,655,043 | B2 | 2/2014 | Dixon | |
| 2014/0285654 | A1 * | 9/2014 | Araya | G02B 21/0076 348/80 |

FOREIGN PATENT DOCUMENTS

| | | | | | |
|---|---|---|---|---|---|
| JP | EP 3009872 | A3 * | 7/2016 | ........... | G02B 21/002 |
| WO | 2009137935 | A1 | 11/2009 | | |

* cited by examiner

FIG. 14
EXPANDED FULL SCALE SETTING
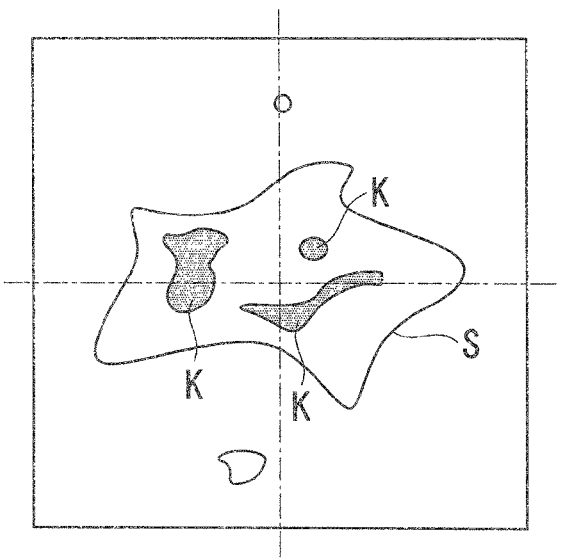
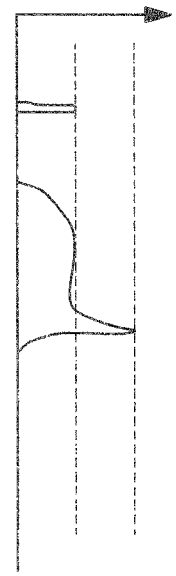
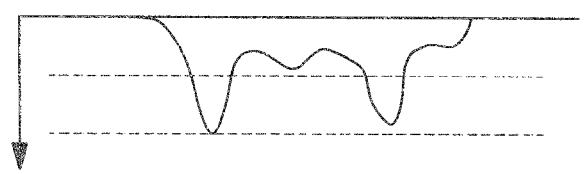

LASER MICROSCOPE WHICH EXPANDS THE DYNAMIC RANGE OF AN INTENSITY SIGNAL AND SUPPRESSES DEGRADATION OF A LIGHT DETECTING PORTION

CROSS-REFERENCE TO RELATED APPLICATIONS

This application is based on Japanese Patent Application No. 2014-212732, the contents of which are incorporated herein by reference.

TECHNICAL FIELD

The present invention relates to a laser microscope.

BACKGROUND ART

In the related art, there is a known laser microscope provided with a photomultiplier tube (PMT) serving as a detector that detects light and outputs an intensity signal of the detected light (for example, see Patent Literature 1). A PMT has a risk of suffering degradation when an excessive level of light is incident thereon, and therefore, in a conventional laser microscope, the maximum range of the intensity signal from the PMT which can be converted to brightness information (hereinafter referred to as "full scale") is set to a range that does not cause degradation of the PMT, and the laser light power, a high-voltage (HV) applied to the PMT, or the like is adjusted so that the output signal from the PMT does not exceed the full scale.

CITATION LIST

Patent Literature

{PTL 1}
Japanese Unexamined Patent Application, Publication No. 2014-145959

SUMMARY OF INVENTION

When a specimen is given a light stimulus, a strong response may be obtained according to the strength of the light stimulus. Therefore, setting the full scale on the basis of the brightness of light from a specimen that is not given a light stimulus may cause the brightness of light from a site where a strong response is obtained to saturate. On the other hand, setting the full scale on the basis of the brightness of light from a photoresponsive site on the specimen that is given a light stimulus may cause the brightness of extremely weak light from areas other than the photoresponsive site to become buried in noise. In these cases, correct brightness information is not obtained. In addition, even if the specimen exhibits a strong response, setting a low laser power or low HV of the PMT so that the brightness does not saturate causes the overall brightness to become low, and makes it difficult to set conditions, including the position of the photoresponsive site and so forth.

The present invention provides a laser microscope that expands the dynamic range of the intensity signal and that suppresses degradation of a light detecting portion.

A first of the present invention is a laser microscope comprising: a light irradiating portion that irradiates a specimen with laser light; a light detecting portion that detects light from the specimen irradiated with the laser light by the light irradiating portion and that outputs an intensity signal; an information converting portion that converts the intensity signal output from the light detecting portion to brightness information at each pixel; a full-scale setting portion that can optionally set, in the information converting portion, a normal full scale that is smaller than the intensity signal of the light from the specimen when given a light stimulus and an expanded full scale that is larger than the normal full scale, as a maximum range of the intensity signal that can be converted to brightness information by the information converting portion; a switching determination portion that determines whether to switch between a normal observation mode in which the brightness information of the specimen when the light stimulus is not given thereto is obtained and a stimulation observation mode in which the brightness information. of the specimen when the light stimulus is given thereto is obtained; and a setting control portion that controls the full-scale setting portion on the basis of a result of the determination by the switching determination portion so that the normal full scale is set in the normal observation mode, and the expanded full scale is set in the stimulation observation mode.

With this aspect, when the observation mode is switched, the full-scale setting portion is controlled by the setting control portion on the basis of the determination. result in the switching determination portion, and, in the information converting portion, the normal full scale is set in the normal observation mode, and the expanded full scale is set in the stimulation observation mode. Then, in each observation mode, the light from the specimen that is irradiated with the laser light by the light irradiating portion is detected by the light detecting portion, and the intensity signal of the light within the full scale according to the observation mode is converted to brightness information by the information converting portion.

In this case, since the normal full scale is smaller than the intensity signal of the light from the specimen when the light stimulus is given thereto, if at least one of the power of the laser light and the voltage applied to the light detecting portion is set so that the intensity signal output from the light detecting portion does not exceed the normal full scale, it is possible to prevent the output from the light detecting portion in the normal observation mode from becoming excessively large in a steady manner, and degradation of the light detecting portion can thus be suppressed.

In addition, in the stimulation observation mode in which an expanded full scale that is larger than the normal full scale is set, the dynamic range of the intensity signal can be expanded, allowing brightness information of intense light from the specimen to be obtained. A light detecting portion like a photomultiplier tube shows almost no degradation even when irradiated with light having a certain level of intensity, so long as the time is short, and therefore, in the stimulation observation mode, large degradation of the light detecting portion never occurs even when intense light from the specimen is incident on the light detecting portion.

In the above-described aspect, the information converting portion may switch a conversion coefficient for converting the intensity signal to brightness information, between the normal observation mode and the stimulation observation mode.

With this configuration, in each observation mode, it is possible to display intensity signals within the respective full scales using high-contrast brightness information.

In the above-described aspect, the information converting portion may includes a table in which the intensity signal and the brightness information for the normal observation mode and the stimulation observation mode are associated and may convert the intensity signal to the brightness information on the basis of the table.

With this configuration, the time required for computational processing can be shortened, and in each observation mode, intensity signals within the corresponding full scales can be rapidly converted to high-contrast brightness information and displayed.

A second aspect of the present invention is a laser microscope including a light irradiating portion that irradiates a specimen with laser light; a light detecting portion that detects light from the specimen irradiated with the laser light by the light irradiating portion and that outputs an intensity signal; an information converting portion that converts the intensity signal output from the light detecting portion to brightness information at each pixel with a prescribed first conversion coefficient and that divides the brightness information into two channels; a scale-converting portion that converts the brightness information on one of the channels divided by the information converting portion with a prescribed second conversion coefficient that differs from the prescribed first coefficient; a channel-information appending portion that attaches different channel information to the brightness information in the two channels; a full-scale setting portion that can optionally set, in the information converting portion, a normal full scale that is smaller than the intensity signal of the light from the specimen when given a light stimulus and an expanded full scale that is larger than the normal full scale, as a maximum range of the intensity signal that can be converted to brightness information by the information converting portion; a switching determination portion that determines whether to switch between a normal observation mode in which the brightness information of the specimen when the light stimulus is not given thereto is obtained and a stimulation observation mode in which the brightness information of the specimen when the light stimulus is given thereto is obtained; and a setting control portion that controls the full-scale setting portion on the basis of a result of the determination by the switching determination portion so that the normal full scale is set in the normal observation mode, and the expanded full scale is set in the stimulation observation mode.

With this aspect, the brightness information that is converted by the information converting portion with the prescribed first conversion coefficient is divided into two channels, and the brightness information in one of the channels is further converted with a prescribed second conversion coefficient and is output, whereas the brightness information in the other channel is output as is. The sets of brightness information in the respective channels have different channel information attached thereto by the channel-information appending portion, thus making it easy to use them separately.

In this case, as the prescribed first conversion coefficient, if a value for which the intensity signal in the normal full scale has higher contrast is set, and this brightness information is used as is after being converted with the first conversion coefficient, it is possible to use even extremely weak brightness information from the specimen, which is not buried in noise.

On the other hand, as the prescribed second conversion coefficient, if a value for which the brightness information in the expanded full scale becomes high contrast is set, and this brightness information is used after being converted by the scale-converting portion with the second conversion coefficient, the dynamic range of the brightness information can be expanded, and thus, brightness information of intense light from the specimen can be obtained. If the brightness information output as is and the brightness information that is further converted with the second conversion coefficient are compared, the brightness information that exceeds the normal full scale can be ascertained at a glance.

In the above-described aspect, the maximum range of the expanded full scale may be smaller than a maximum value of the intensity signal of the light from the specimen when the light stimulus is given thereto.

With this configuration, in the stimulation observation mode, brightness information of intense light from the specimen can be obtained while preventing it from becoming buried in noise.

In the above-described aspect, the maximum range of the expanded full scale may be larger than a maximum value of the intensity signal of the light from the specimen when the light stimulus is given thereto.

With this configuration, in the stimulation observation mode, the brightness information of intense light from the specimen can be obtained without causing it to saturate.

In the above-described aspect, the expanded full scale may be variable.

With this configuration, by changing the expanded full scale according to the response in the specimen to which a light stimulus is given, it is possible to obtain brightness information of the specimen to which a light stimulus is given without any loss.

The present invention affords advantages in that the dynamic range of an intensity signal is expanded and degradation of a light detecting portion is restricted.

BRIEF DESCRIPTION OF DRAWINGS

FIG. 14 is a diagram showing an example of an image Of a specimen obtained in a stimulation observation mode with the scanning laser microscope in FIG. 12.

DESCRIPTION OF EMBODIMENTS

First Embodiment

A scanning laser microscope (laser microscope) according to a first embodiment of the present invention will be described below with reference to the drawings.

Figure 1:
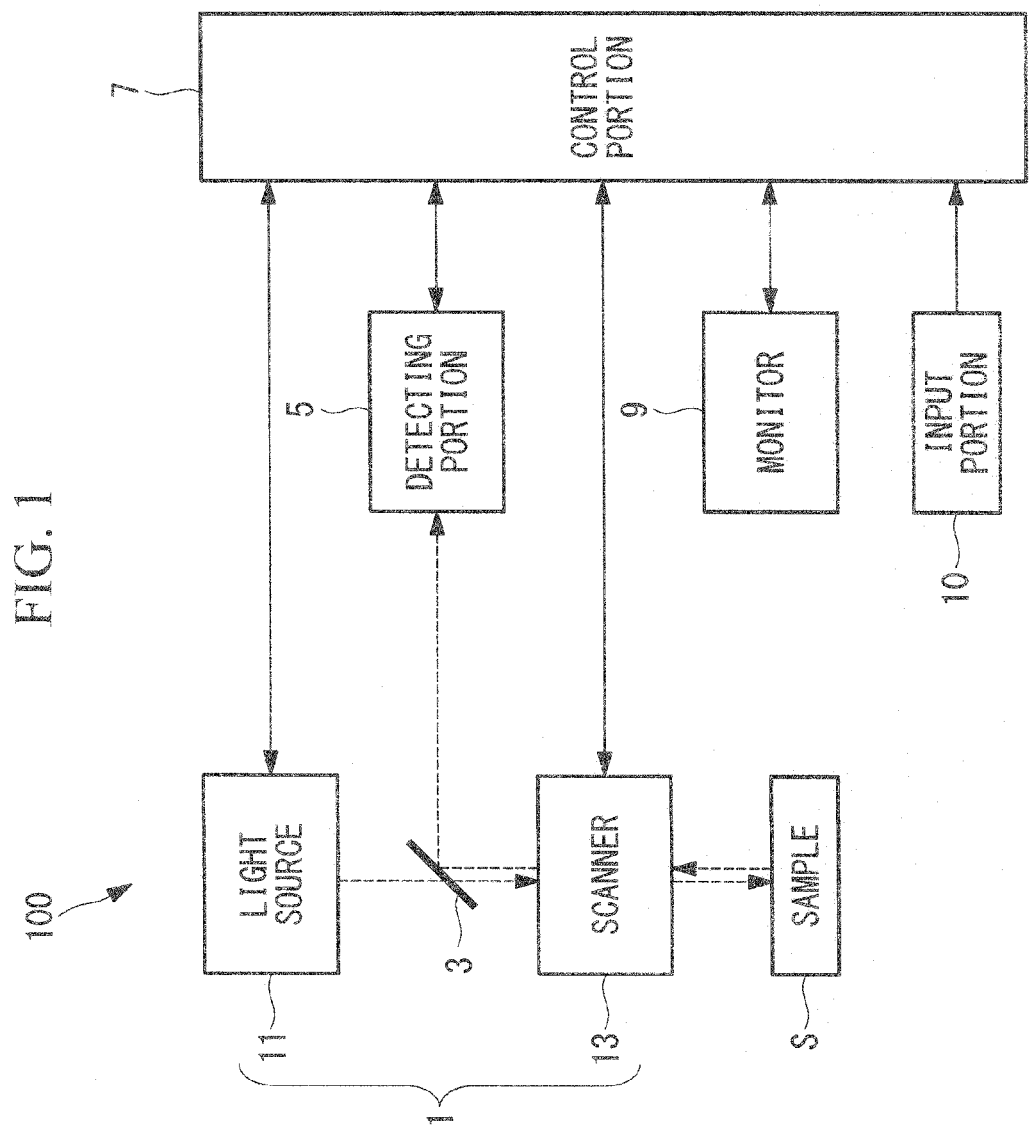
FIG. 1 is a diagram showing, in outline, the configuration of a scanning laser microscope according to a first embodiment of the present invention.

As shown in FIG. 1, a scanning laser microscope 100 according to this embodiment includes, for example, a light irradiating portion 1 that irradiates a sample (specimen) S with laser light; a dichroic mirror 3 that splits off, from the light path of the laser light, fluorescence (light) generated in the sample S irradiated with the laser light by the light irradiating portion 1; a detecting portion 5 that detects the fluorescence split off by the dichroic mirror 3; a control portion (switching determination portion) 7 that performs control of the light irradiating portion 1 and the detecting portion 5, image creation, determination of whether to switch the observation mode, or the like; a monitor 9 that displays an image created by the control portion 7 and so forth; and an input portion 10 that allows the user to input the observation mode.

The observation mode includes an imaging-only mode (hereinafter referred to as "normal observation mode"), in which brightness information of a sample S when a light stimulus is not given thereto is obtained, and a light-stimulus-and-imaging mode (hereinafter referred to as "stimulation observation mode"), in which brightness information of the sample S when a light stimulus is given thereto is obtained.

The light irradiating portion 1 is formed of a light source 11 that is formed of lasers of a plurality of wavelengths, which generate laser light according to whether observation or stimulation is to be performed, and a scanner 13, such as a galvanometer mirror, that two-dimensionally scans the laser light emitted from the light source 11 on the sample S.

The dichroic mirror 3 allows the laser light from the light source 11 to pass therethrough towards the scanner 13, while reflecting towards the detecting portion 5 the fluorescence that returns from the sample S along the light path of the laser light via the scanner 13.

Figure 2:
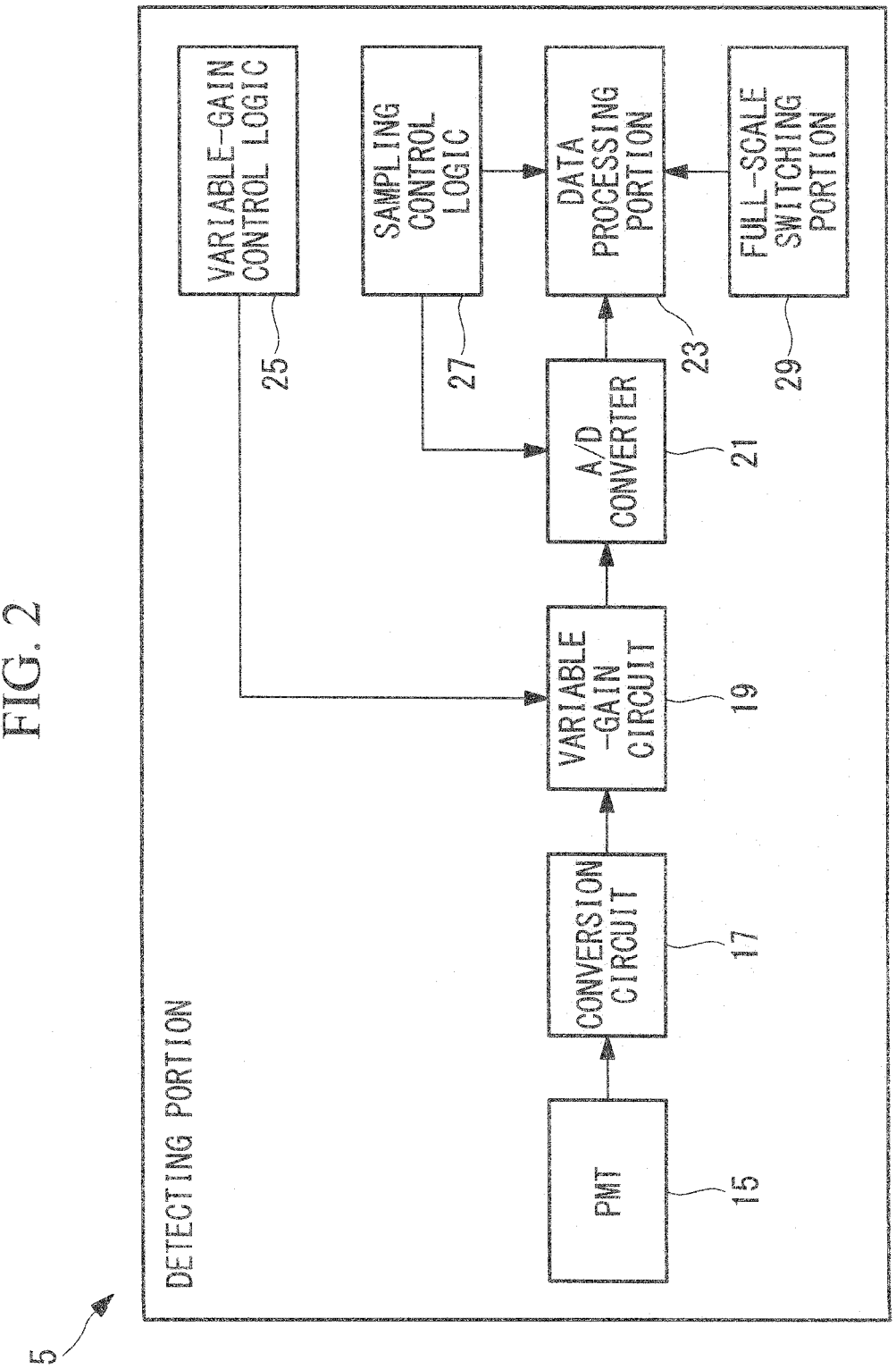
FIG. 2 is a diagram showing, in outline, the configuration of a detecting portion of the scanning laser microscope in FIG. 1.

As shown in FIG. 2, the detecting portion 5 includes a PMT (photomultiplier tube, photoelectron multiplier tube, light detecting portion) 15 that detects the fluorescence and converts it to an intensity signal; a conversion circuit 17 that converts the intensity signal output from the PMT 15 from a current signal to a voltage signal; a variable-gain circuit 19 that multiplies the voltage signal output from the conversion circuit 17 by a prescribed value; an A/D converter 21 that A/D converts the voltage signal output from the variable-gain circuit 19; and a data processing portion (information converting portion) 23 that processes the digital data output from the A/D converter 21.

The detecting portion 5 also includes a variable-gain control logic 25 that sets the prescribed value in the variable-gain circuit 19; a sampling control logic 27 that controls the sampling timing of the voltage signal by the A/D converter 21; and a full-scale switching portion (full-scale setting portion, setting control portion) 29 that switches the maximum range (hereinafter referred to as "full scale") of the intensity signal which can be converted to brightness information by the data processing portion 23.

Figure 3:
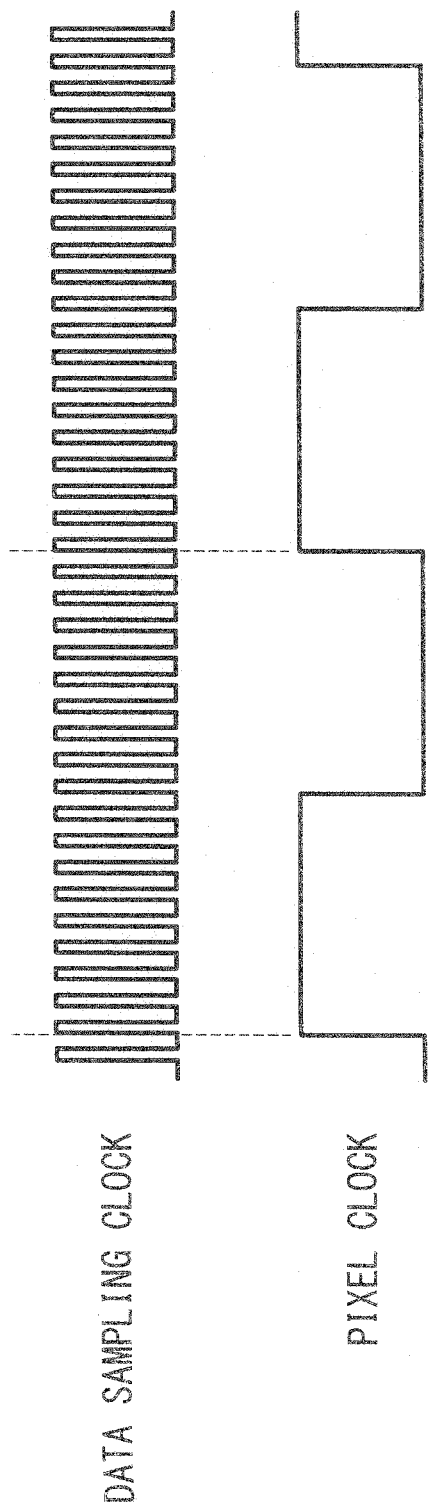
FIG. 3 is a timing chart showing the relationship between a pixel clock and data sampling in an A/D converter.

The sampling control logic 27 sends a data sampling clock, like that shown in FIG. 3, to the A/D converter 21. The A/D converter 21 samples the voltage signal according to the data sampling clock sent from the sampling control logic 27 and converts it to digital data.

Figure 4:
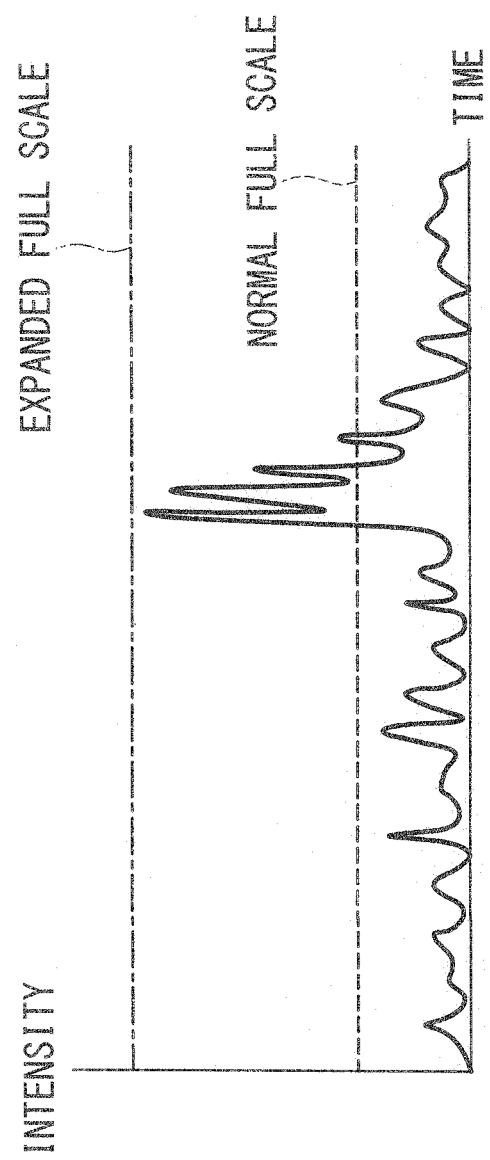
FIG. 4 is a diagram showing an example of a normal full scale and an expanded full scale.

As shown in FIG. 4, the full-scale switching portion 29 can optionally set the normal full scale, which is used in the normal observation mode, and the expanded full scale, which is used in the stimulation observation mode, in the data processing portion 23. The expanded full scale can be freely changed by the user, and the maximum range of the expanded full scale is assumed to be larger than the maximum value of the intensity signal of fluorescence from the sample S when given a light stimulus.

The full-scale switching portion 29 sets, in the data processing portion 23, the normal full scale in the normal observation mode and the expanded full scale in the stimulation observation mode. In addition, the full-scale switching portion 29 switches between the normal full scale setting and the expanded full scale setting on the basis of the result of a determination about switching the observation mode by the control portion 7. The full-scale switching portion 29 has a built-in I/F (interface circuit), CPU, ROM, RAM, etc. on an electrical board, and the CPU realizes its function by executing a program written in the ROM.

The data processing portion 23 performs cumulative addition on a plurality of digital data values sent from the A/D converter 21 in accordance with a pixel clock, which is a timing signal in units of single pixel, as shown in FIG. 3, to convert the values to a single item of brightness information. In addition, the data processing portion 23 changes the number of iterations of the cumulative addition of the digital data according to the full scale set by the full-scale switching portion 29.

For example, the data processing portion 23 performs cumulative addition four times on the digital data at the rising edge timing of the pixel clock in the case of the normal full scale, and performs cumulative addition two times on the digital data at the rising edge timing of the pixel clock in the case of the expanded full scale. By doing so, for example, in the case of the normal full scale, the intensity signal from the PMT 15 is converted to brightness information 1023 at 2 µA, and in the case of the expanded full scale, the intensity signal from the PMT 15 is converted to brightness information 1023 4 µA. In this system, the range of brightness information that can be displayed on the monitor 9 is 1024 levels, from 0 to 1023. The brightness information converted by the data processing portion 23 is sent to the control portion 7. This data processing portion 23 has a built-in I/F (interface circuit), CPU, ROM, RAM, etc. on an electrical board, and the CPU realizes its function by executing a program written in the ROM.

Figure 5:
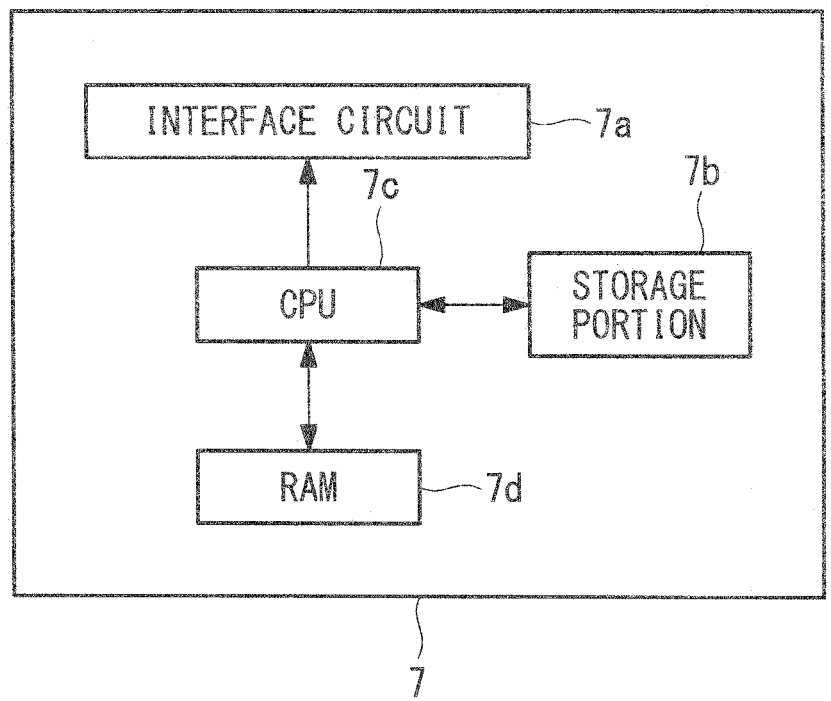
FIG. 5 is a block diagram showing the configuration of a control portion in FIG. 1.

As shown in FIG. 5, the control portion 7 includes an interface circuit 7a, a storage portion 7b such as a hard disk drive, a CPU 7c, and a RAM 7d. The monitor 9 and the input portion 10 are connected to the control portion 7.

The interface circuit 7a includes a control board for controlling the individual components of the scanning laser microscope 100 (the detecting portion 5, the light source 11, the scanner 13, etc.) and a signal processing board for receiving output signals from the data processing portion 23 in the detecting portion 5 and converting them to image brightness signals.

Figure 6:
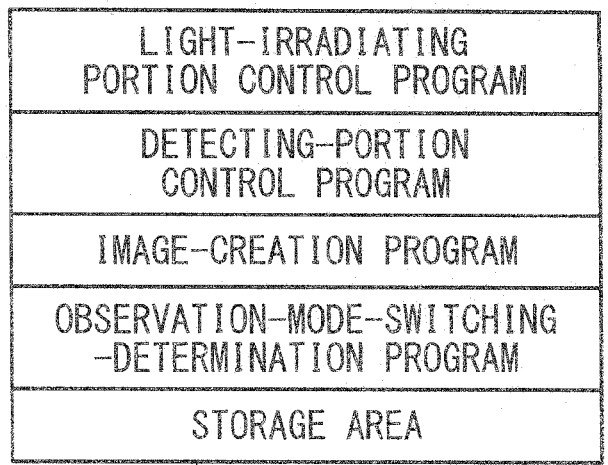
FIG. 6 is a diagram showing CPU programs stored in a storage portion in FIG. 5.

As shown in FIG. 6, programs that the CPU 7c executes and so forth are stored in the storage portion 7b. Specifically, a light-irradiating-portion control program, a detecting-portion control program, an image-creation program, an observation-mode-switching-determination program, as well as data, are stored in the storage portion 7b.

The CPU 7c has a function for controlling the light irradiating portion 1, a function for controlling the detecting portion 5, a function for creating an image, and a function for determining whether to switch the observation mode. This CPU 7c loads the above-described individual programs that are stored in the storage portion 7b and executes corresponding subroutines for these functions.

Specifically, by executing the light-irradiating-portion control program on the CPU 7c, the control portion 7 controls the scanning of the laser light by the scanner 17 and sets the light source 11 to a laser power for the normal observation mode and a laser power for the stimulation observation mode. Also, by executing the detecting-portion control program on the CPU 7c, the control portion 7 sets the HV (High Voltage) to be applied to the PMT 15. The control portion 7 adjusts at least one of the laser power for the normal observation mode in the light source 11 and the HV to be applied to the PMT 15 so that the intensity signal output from the PMT 15 in the case where the sample S is irradiated with the laser light for the normal observation mode from the light source 11 does not exceed the normal full scale.

Also, by executing the observation-mode-switching-determination program on the CPU 7c, the control portion 7 determines whether to switch between the normal observation mode and the stimulation observation mode, which are input by the user, and sends the result of the determination to the detecting portion 5. In addition, by executing the image-creation program on the CPU 7c, the control portion 7 creates a two-dimensional image of the sample S on the basis of the brightness information sent from the detecting portion 5 and the scanning position information of the laser light scanned by the scanner 13 and displays the image on the monitor 9.

Figure 7:
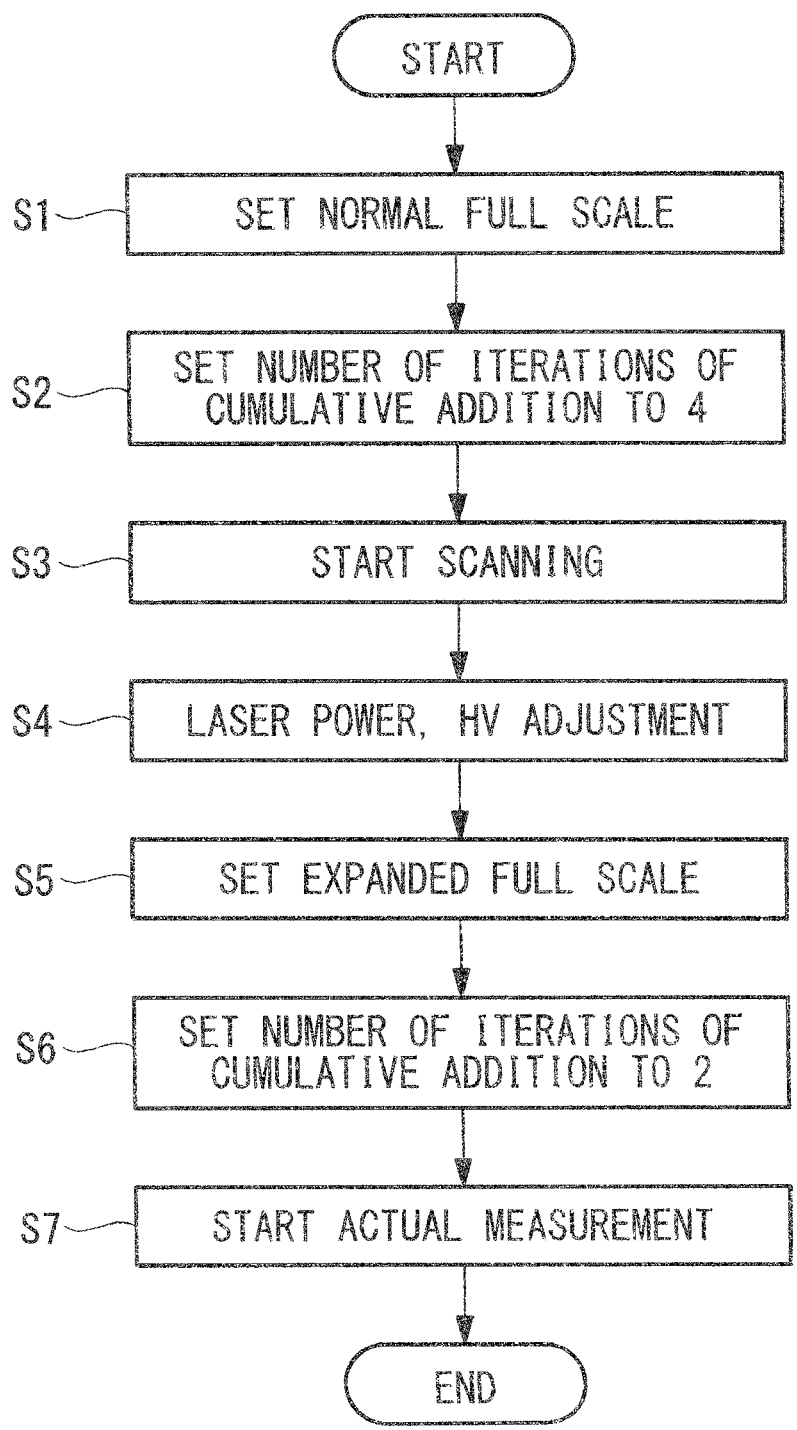
FIG. 7 is a flowchart for explaining observation of a sample with the scanning laser microscope in FIG. 1.

The operation of the thus-configured scanning laser microscope 100 will now be described with reference to the flowchart in FIG. 7.

The observation of the sample S with the scanning laser microscope 100 according to this embodiment is divided into a measurement preparation stage which is performed in the normal observation mode (steps S1 to S4) and an actual measurement stage performed in the stimulation observation mode (steps S5 to S7).

In the measurement preparation stage, the user sets the normal observation mode, whereby the observation mode is determined in the control portion 7, and on the basis of the determination result in the control portion 7, the normal full scale is set in the data processing portion 23 by the full-scale switching portion 29 (step S1). In the data processing portion 23, by setting the normal full scale, the number of iterations of the cumulative addition of the intensity signal is set to 4 (step S2).

Next, the control portion 7 causes the laser light to be emitted from the light source 11, and the laser light is two-dimensionally scanned on the sample S by the scanner 13 (step S3). The fluorescence generated in the sample S as a result of being irradiated with the laser light travels via the scanner 13, is reflected by the dichroic mirror 3, and is incident on the detecting portion 5.

In the detecting portion 5, the fluorescence from the sample S is detected by the PMT 15, an intensity signal is output, and after that intensity signal is converted to a voltage signal by the conversion circuit 17, the voltage signal is multiplied by a prescribed value by the variable-gain circuit 19. Then, the voltage signal output from the variable-gain circuit 19 is sampled and A/D converted by the A/D converter 21, and the digital data is sent to the data processing portion 23.

In the data processing portion 23, the plurality of digital data values sent from the A/D converter 21 are cumulatively added 4 times for each pixel so as to be converted to a single value of brightness information, which is sent to the control portion 7. In the control portion 7, an image of the sample S when not given a light stimulus is created on the basis of the brightness information from the data processing portion 23 and the scanning information for the scanner 13. The image created by the control portion 7 is displayed on the monitor 9.

In addition, based on the brightness information from the data processing portion 23, in the case where the sample S is irradiated with the normal-observation-mode laser light from the light source 11, the normal-observation-mode laser power of the light source 11 and the HV applied to the PMT 15 are adjusted by the control portion 7 so that the intensity signal output from the PMT 15 does not exceed the normal full scale (step S4).

In this case, since the normal full scale is smaller than the intensity signal of the fluorescence from the sample S when given a light stimulus, by setting the normal-observation-mode laser power of the light source 11 and the HV of the PMT 15 so that the intensity signal output from the PMT 15 does not exceed the normal full scale, it is possible to prevent the output from the PMT 15 in the normal observation mode from becoming excessively large in a steady manner, which can suppress degradation of the PMT 15.

Next, the process proceeds to the actual measurement stage. In the actual measurement stage, the user switches to the stimulation observation mode, whereby it is determined in the control portion 7 whether to switch the observation mode, and on the basis of the determination result in the control portion 7, the expanded full scale is set in the data processing portion 23 by the full-scale switching portion 29 (step S5). In the data processing portion 23, by setting the expanded full scale, the number of iterations of the cumulative addition of the intensity signal is set to two (step S6). The normal-observation-mode laser power of the light source 11 and the HV applied to the PMT 15 are kept at the values set in the measurement preparation stage.

In the actual measurement stage, for example, the sample S is irradiated with stimulus light by the light source 11, so that the sample S is optically stimulated.

In the scanning laser microscope 100, the actual measurement starts (step S7), and similarly to the measurement preparation stage, under the control of the control portion 7, the sample S is irradiated with stimulation-observation-mode laser light by the light irradiating portion 1, and the fluorescence from the sample S is detected by the detecting portion 5.

In the detecting portion 5, a plurality of digital data values sent from the A/D converter 21 are cumulatively added two times for each pixel to be converted to a single value of brightness information by the data processing portion 23, and this brightness information is sent to the control portion 7. In the control portion 7, an image of the sample S when given a light stimulus is created on the basis of the brightness information from the data processing portion 23 and the scanning information for the scanner 13. The image created by the control portion 7 is displayed on the monitor 9.

In this case, in the stimulation observation mode, in which the expanded full scale which is larger than the normal full scale is set, the dynamic range of the intensity signal is expanded, and thus it is possible to obtain brightness information of intense light from the sample S. If an expanded full scale which is larger than the maximum value of the intensity signal of the fluorescence from the sample S when given a light stimulus is set, it is possible to obtain brightness information of intense light from the sample S in the stimulation observation mode, without saturation. This is effective in cases where there is no problem even though the brightness information becomes somewhat buried in noise. If the PMT operates for a short time, even if a certain level of intense light is incident thereon, almost no degradation occurs, and therefore, even if intense light from the sample S is incident on the PMT 15 in the stimulation observation mode, a large amount of degradation of the PMT 15 does not occur.

As described above, with the scanning laser microscope 100 according to this embodiment, it is possible to suppress degradation of the PMT 15 by switching the full scale between the measurement preparation stage and the actual measurement stage and setting the laser power and HV conditions so that intense fluorescence from the sample S is not incident on the PMT 15, and in addition, it is possible to obtain intense brightness information from the sample S when given a light stimulus by expanding the dynamic range of the intensity signal in the actual measurement stage.

This embodiment can be modified in the following ways.

In this embodiment, it has been assumed that the maximum range of the expanded full scale is larger than the intensity signal of the fluorescence generated in the sample S when given a light stimulus. As a first modification, instead of this, the maximum range of the expanded full scale may be smaller than the maximum value of the intensity signal of the fluorescence from the sample S when given a light stimulus.

By doing so, if an expanded full scale that is larger than the normal full scale and smaller than the maximum value of the intensity signal of the fluorescence from the sample S when given a light stimulus is set, in the stimulation observation mode, it is possible to prevent the brightness information of intense fluorescence from the sample S from becoming buried in noise. This is effective in cases where there is no problem even if the brightness information is somewhat saturated.

In this embodiment, it has been assumed that the number of iterations of the cumulative addition of the intensity signal is changed between the normal observation mode and the stimulation observation mode. As a second modification, instead of this, for example, the variable gain (conversion coefficient) in the variable-gain circuit 19 may be changed between the normal observation mode and the stimulation observation mode. In addition, for example, an integrator may be employed instead of the variable-gain circuit 19, and the integration time thereof may be changed between the normal observation mode and the stimulation observation mode. In these cases, the variable gain or integration time should be changed so that intensity signals within the respective full scales in each observation mode can be displayed as high-contrast brightness information.

Figure 8:
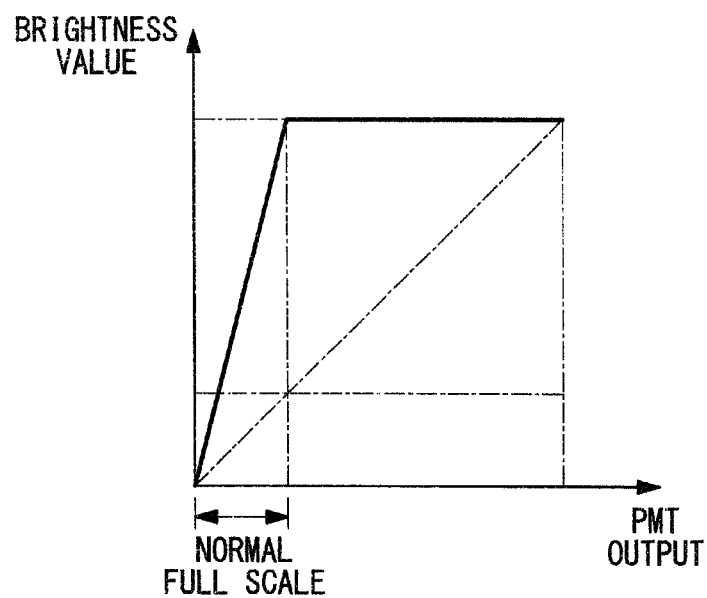
FIG. 8 is a diagram showing an example of a lookup table for a normal full scale in a scanning laser microscope according to a third modification of the first embodiment of the present invention.
Figure 9:
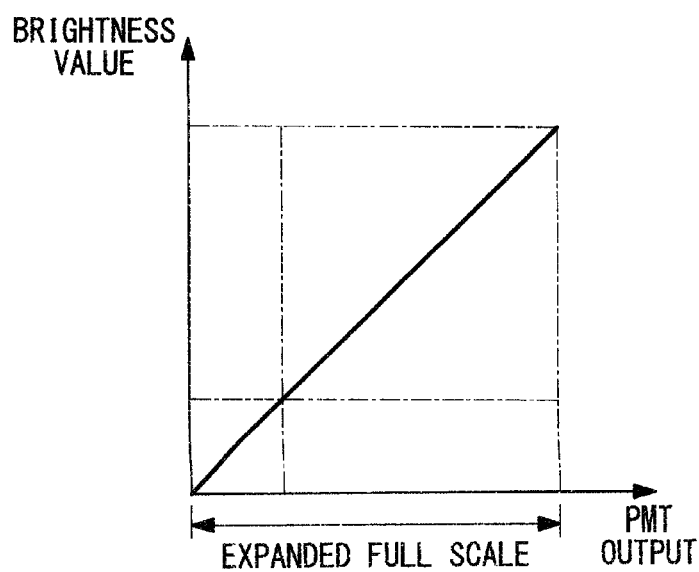
FIG. 9 is a diagram showing an example of a lookup table for an expanded full scale in the scanning laser microscope according to the third modification of the first embodiment of the present invention.

In addition, as a third modification, for example, as shown in FIG. 8 and FIG. 9, the data processing portion 23 may have a lookup table that associates the intensity signals in the normal observation mode and the stimulation observation mode with brightness values and may convert the intensity signal to brightness information on the basis of this lookup table.

FIG. 8 shows an example of the lookup table when the normal full scale is set, and FIG. 9 shows an example of the lookup table when the expanded full scale is set. The data processing portion 23 should convert the intensity signal to brightness information on the basis of the lookup table in FIG. 8 in the measurement preparation stage, and should convert the intensity signal to brightness information on the basis of the lookup table in FIG. 9 in the actual measurement stage.

By doing so, the time required for computational processing in the data processing portion 23 can be shortened, and in each observation mode, it is possible to rapidly convert intensity signals within the respective full scales to high-contrast brightness information.

Figure 10A:
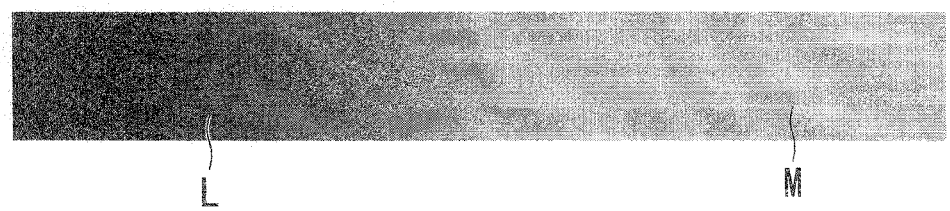
FIG. 10A is a diagram showing an example of a lookup table for a scanning laser microscope according to a fourth modification of the first embodiment of the present invention.
Figure 11A:
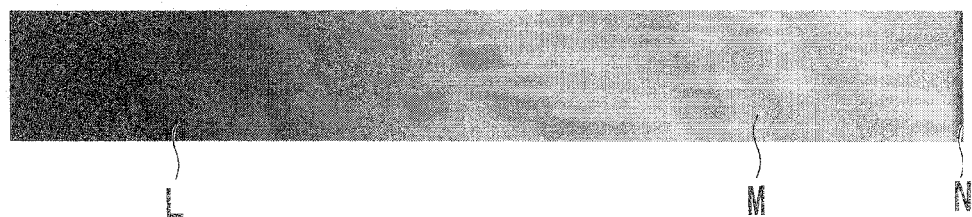
FIG. 11A is a diagram showing an example of another lookup table for the scanning laser microscope according to the fourth modification of the first embodiment of the present invention.

As a fourth modification, instead of the third modification, it is possible to use a lookup table in which display colors of the brightness information are changed to RGB values, as shown in FIGS. 10A and 11A, for example.

Figure 10B:
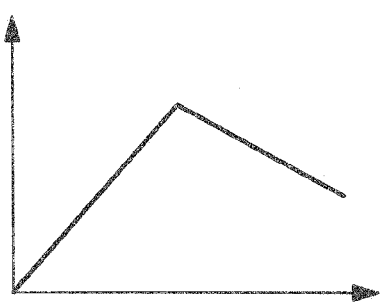
FIG. 10B is a diagram showing an example of the relationship between the intensity of red shown in FIG. 10A and the output from a PMT.
Figure 10C:
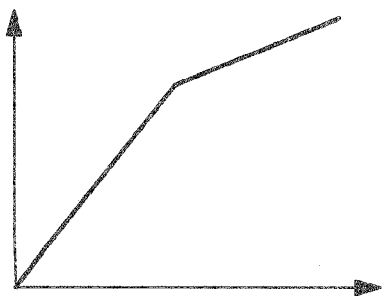
FIG. 10C is a diagram showing an example of the relationship between the intensity of green shown in FIG. 10A and the output from the PMT.
Figure 10D:
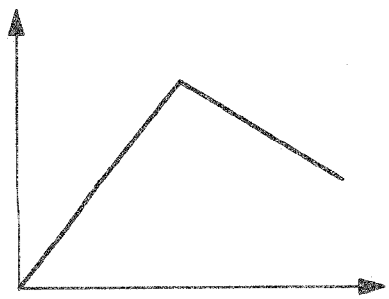
FIG. 10D is a diagram showing an example of the relationship between the intensity of blue shown in FIG. 10A and the output from the PMT.

In this case, as shown in FIG. 10A, for example, a portion of the normal full scale may be displayed as a gray scale (see reference sign L in FIG. 10A), and a portion of the expanded full scale which is larger than the normal full scale may be displayed in another color (see reference sign M in FIG. 10A). FIG. 10B shows the relationship between the intensity of red shown in FIG. 10A and the output from the PMT 15, FIG. 10C shows the relationship between the intensity of green shown in FIG. 10A and the output from the PMT 15, and FIG. 10D shows the relationship between the intensity of blue shown in FIG. 10A and the output from the PMT 15. In this case, the portion indicated by reference sign M in FIG. 10A is mainly green.

By doing so, it is possible to roughly ascertain the position at which the fluorescence intensity signal reaches the expanded full scale region, as well as the approximate brightness value of that fluorescence intensity signal.

Figure 11B:
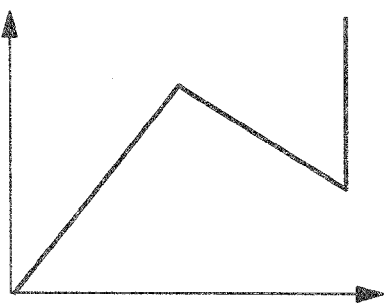
FIG. 11B is a diagram showing an example of the relationship between the intensity of red shown in FIG. 11A and the output from the PMT.
Figure 11C:
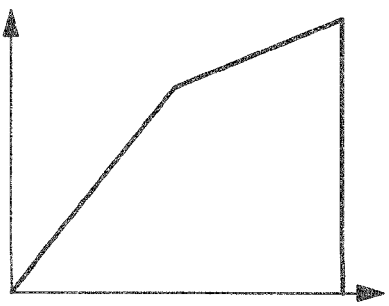
FIG. 11C is a diagram showing an example of the relationship between the intensity of green shown in FIG. 11A and the output from the PMT.
Figure 11D:
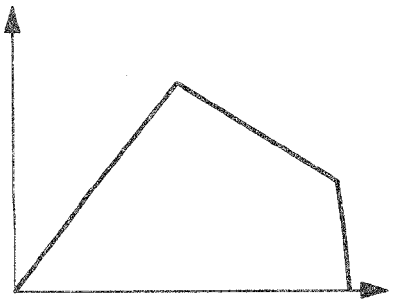
FIG. 11D is a diagram showing an example of the relationship between the intensity of blue shown in FIG. 11A and the output from the PMT.

In this modification, as shown in FIG. 11A, the display color of the highest-brightness portion in the expanded full scale may be changed further (see reference sign N in FIG. 11A). FIG. 11B shows the relationship between the intensity of red shown in FIG. 11A and the output from the PMT 15, FIG. 11C shows the relationship between the intensity of green shown in FIG. 11A and the output from the PMT 15, and FIG. 11D shows the relationship between the intensity of blue shown in FIG. 11A and the output from the PMT 15.

In this case, the portion indicated by reference sign M in FIG. 11A is green, and the portion indicated by reference sign N is red.

By doing so, it is possible to make the portion where the expanded full scale is exceeded more clear.

Second Embodiment

Next, a scanning laser microscope (laser microscope) according to a second embodiment of the present invention will be described.

Figure 12:
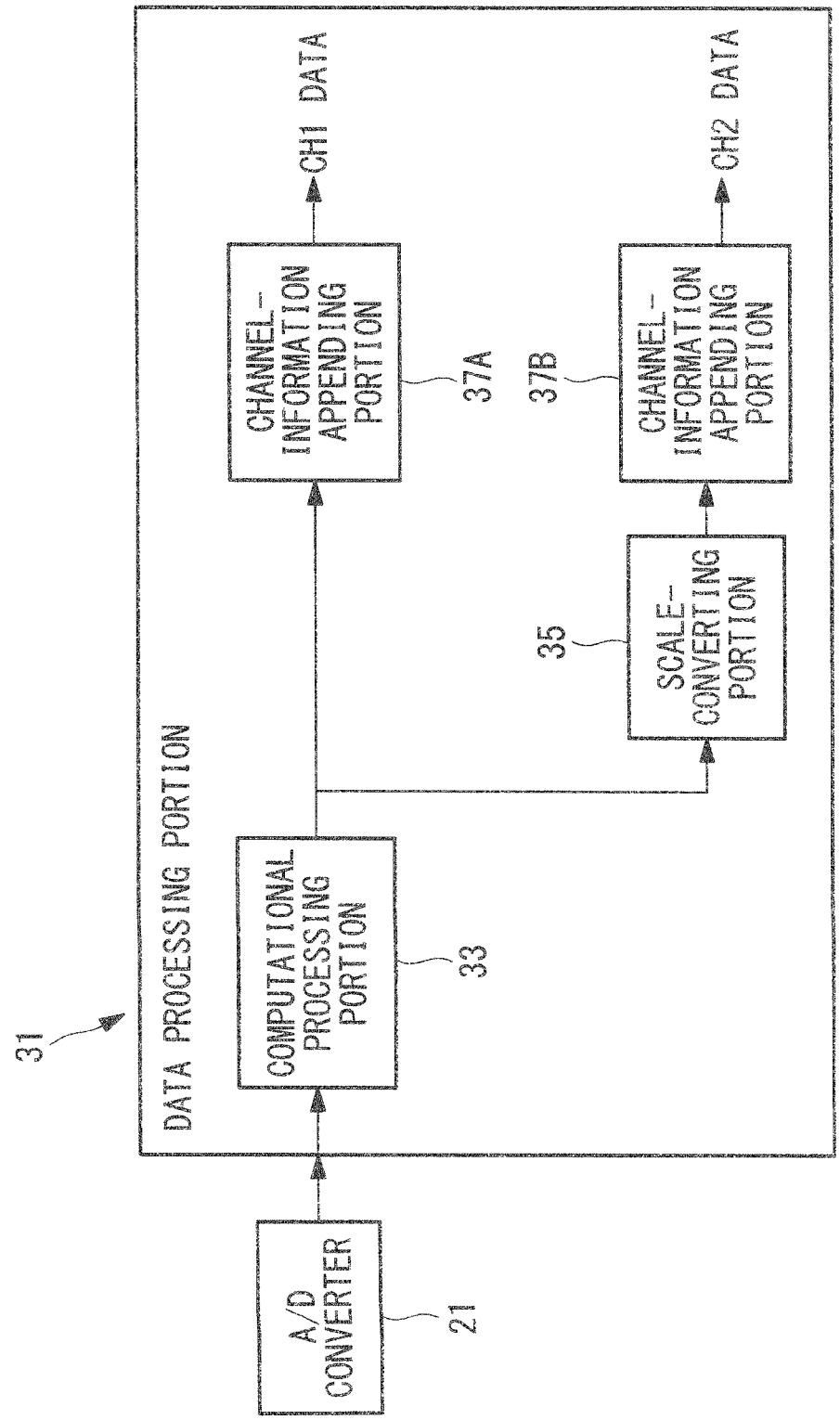
FIG. 12 is a diagram showing, in outline, the configuration of a data processing portion of a scanning laser microscope according to a second embodiment of the present invention.

The scanning laser microscope 100 according to this embodiment differs from the first embodiment in that, as shown in FIG. 12, a data processing portion (information converting portion) 31 that separates the digital data into two channels and outputs the separated data is provided instead of the data processing portion 23.

The configuration other than the data processing portion 31 is the same as that in the first embodiment, and therefore a description thereof will be omitted in what follows. In addition, parts having the same configuration as those in the scanning laser microscope 100 according to the first embodiment are assigned the same reference signs, and a description thereof is omitted.

The data processing portion 31 includes a computational processing portion 33 that converts the digital data sent from the A/D converter 21 into brightness information with a prescribed first conversion coefficient at each pixel and splits the data into two channels; a scale-converting portion 35 that converts the brightness information in one of the two channels divided by the computational processing portion 33, with a prescribed second conversion coefficient; and channel-information appending portions 37A and 37B that attach different channel information to the brightness information in the two channels.

The computational processing portion 33 converts the digital data at each pixel into brightness information with the first conversion coefficient so that the intensity signal within the normal full scale has high contrast. In addition, the computational processing portion 33 outputs the same brightness information on the two channels, sends the brightness information on one of the channels to the channel-information appending portion 37A, and sends the brightness information on the other channel to the scale-converting portion 35.

The scale-converting portion 35 converts the brightness information from the computational processing portion 33 with the second conversion coefficient so that it has high contrast within the expanded full scale, and sends it to the channel-information appending portion 37B.

The channel-information appending portion 37A attaches CH1, serving as channel information, to the brightness information sent from the computational processing portion 33 and sends this to the control portion 7 as CH1 data. The channel-information appending portion 37B attaches CH2, serving as channel information, to the brightness information sent from the scale-converting portion 35 and sends this to the control portion 7 as CH2 data.

In the normal observation mode, the control portion 7 creates an image of the sample S when not given a light stimulus on the basis of the CH1 data, by executing an image-creation program on the CPU 7c. In the stimulation observation mode, the control portion 7 creates an image of the sample S when given a light stimulus on the basis of the CH2 data, by executing the image-creation program on the CPU 7c.

In addition, the control portion 7 adjusts at least one of the normal-observation-mode laser power of the light source 11 and the HV applied to the PMT 15 so that the intensity signal output from the PMT 15 in the case where the sample S is irradiated with normal-observation-mode laser light from the light source 11 does not exceed the normal full scale. Furthermore, the control portion 7 displays the created image on the monitor 9.

The operation of the thus-configured scanning laser microscope 100 will now be described.

To observe the sample S with the scanning laser microscope 100 according to this embodiment, similarly to the first embodiment, the operation is divided into a measurement preparation stage performed in the normal observation mode and an actual measurement stage performed in the stimulation observation mode.

In the measurement preparation stage, the user sets the normal observation mode, whereby the observation mode is determined by the control portion 7, and the normal full scale is set in the data processing portion 31 by the full-scale switching portion 29.

Next, the sample S is irradiated with laser light by the light irradiating portion 1, and fluorescence from the sample S is detected by the detecting portion 5. In the detecting portion 5, the digital data A/D converted by the A/D converter 21 is converted to brightness information at each pixel with the first conversion coefficient by the computational processing portion 33, and this brightness information is divided into two channels and is output.

On one of the channels, the brightness information is sent as is to the channel-information appending portion 37A, where channel information is attached thereto, and this is sent to the control portion 7 as the CH1 data. On the other channel, after the brightness information is further converted with the second conversion coefficient by the scale-converting portion 35, it is sent to the channel-information appending portion 37B, where channel information is attached thereto, and this is sent to the control portion 7 as the CH2 data.

Figure 13:
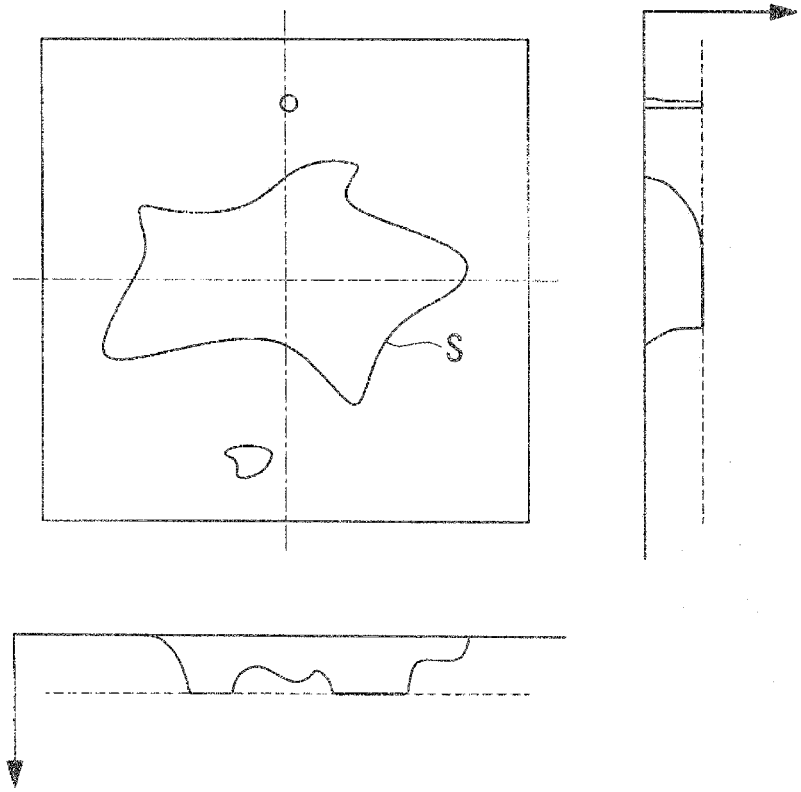
FIG. 13 is a diagram showing an example of an image of a specimen obtained in a normal observation mode with the scanning laser microscope in FIG. 12.

In the control portion 7, on the basis of the brightness information for the CH1 data output from the channel-information appending portion 37A and the scanning information for the scanner 13, an image of the sample S, like that shown in FIG. 13, is created and is displayed on the monitor 9. In addition, the normal-observation-mode laser power of the light source 11 and the HV applied to the PMT 15 are adjusted by the control portion 7, on the basis of the brightness information for the CH1 data, so that the intensity signal output from the PMT 15 in the case where the sample is irradiated with the normal-observation-mode laser light from the light source 11 does not exceed the normal full scale.

In this case, by setting at least one of the normal-observation-mode laser power and the voltage applied to the PMT 15 so that the intensity signal output from the PMT 15 does not exceed the normal full scale, it is possible to prevent the output from the PMT 15 in the normal observation mode from becoming excessively large in a steady manner, and therefore, degradation of the PMT 15 can be suppressed. In addition, in the computational processing portion 33, by directly using the brightness information converted with the first conversion coefficient so that the intensity signal within the normal full scale has high contrast, it is possible to use even extremely weak brightness information from the sample S which is not buried in noise.

Next, in the actual measurement stage, the user switches to the stimulation observation mode, whereby it is determined by the control portion 7 to switch the observation mode, and the expanded full scale is set in the data processing portion 23 by the full-scale switching portion 29. The normal-observation-mode laser power of the light source 11 and the HV applied to the PMT 15 remain at the values set in the measurement preparation stage.

In the actual measurement stage, for example, the sample S is irradiated with stimulus light by the light source 11, so that the sample S is optically stimulated.

In the scanning laser microscope 100, the actual measurement starts, and similarly to the measurement preparation stage, under the control of the control portion 7, the sample S is irradiated with laser light by the light irradiating portion 1, and fluorescence from the sample S is detected by the detecting portion 5. Then, after the digital data A/D converted by the A/D converter 21 is converted to brightness information by the data processing portion 31, it is divided into two channels and is sent to the control portion 7 as CH1 data and CH2 data.

In the control portion 7, on the basis of the brightness information in the CH2 data output from the channel-information appending portion 37B and the scanning information for the scanner 13, an image of the sample S, like that shown in FIG. 14, is created and is displayed on the monitor 9.

In this case, by using the brightness information converted by the scale-converting portion 35 with the second conversion coefficient so that the brightness information from the computational processing portion 33 has high contrast within the expanded full scale, it is possible to obtain intense brightness information from the sample S which is given a light stimulus by expanding the dynamic range of the brightness information. In FIG. 14, reference sign K indicates a portion where a large response occurs in the sample S due to the light stimulus and where intense fluorescence is obtained.

With the scanning laser microscope 100 according to this embodiment, configured as described above, by switching the full scale between the measurement preparation stage and the actual measurement stage, and setting the laser power or HV conditions so that intense fluorescence from the sample S is not incident on the PMT 15, it is possible to suppress degradation of the PMT 15. In addition, by attaching different channel information and dividing the brightness information into two channels, in the measurement preparation stage, by means of the CH1 data, even extremely weak brightness information from the sample S which is not buried in noise can be used, and it is thus possible to obtain intense brightness information from the sample S when given a light stimulus by expanding the dynamic range of the brightness information by using the CH2 data in the actual measurement stage.

In this embodiment, it has been assumed that only the CH2 data is used in the actual measurement stage. Instead of this, in the actual measurement stage, the control portion 7 may create respective images using both the CH1 data and the CH2 data, and the created images may be displayed side-by-side on the monitor 9.

By comparing the brightness information in the CH1 data and the brightness information in the CH2 data, it is possible to ascertain at a glance the brightness information that exceeds the normal full scale.

Each of the above-described embodiments can be modified in the following ways.

Specifically, as a modification of each of the above-described embodiments, information regarding whether the image created by the control portion 7 was created with the normal full scale setting or was created with the expanded full scale setting may be recorded together with the image information in a memory or the like (not illustrated), and this information can be subsequently read out from the memory and referred to together with the image information.

Since the actual fluorescence brightness of the image created with the expanded full scale setting is several times larger than the actual fluorescence brightness of the image created with the normal full scale setting, if the brightness information is converted on the basis of the information about which full scale setting was used to create it, it is possible to perform quantitative measurement of the fluorescence brightness.

Although embodiments of the present invention have been described above with reference to the drawings, the specific configurations are not limited to these embodiments, and design modifications that do not depart from the scope of the present invention are also encompassed. For example, without restricting the present invention to the each of the above embodiments and modifications thereof, the invention can be applied to embodiments in which these embodiments and modifications are appropriately combined and is not particularly limited.

REFERENCE SIGNS LIST

1 LIGHT IRRADIATING PORTION
5 DETECTING PORTION
7 CONTROL PORTION (SWITCHING DETERMINATION PORTION)
15 PMT (LIGHT DETECTING PORTION)
23, 31 DATA PROCESSING PORTION (INFORMATION CONVERTING PORTION)
29 FULL-SCALE SWITCHING PORTION (FULL-SCALE SETTING PORTION, SETTING CONTROL PORTION)
33 COMPUTATIONAL PROCESSING PORTION
35 SCALE-CONVERTING PORTION
37a CHANNEL-INFORMATION APPENDING PORTION
37b CHANNEL-INFORMATION APPENDING PORTION
100 SCANNING LASER MICROSCOPE
S SAMPLE (SPECIMEN)

The invention claimed is:

1. A laser microscope comprising:
a light irradiating portion that irradiates a specimen with laser light;
a light detecting portion that detects light from the specimen irradiated with the laser light by the light irradiating portion and that outputs an intensity signal;
an information converting portion that converts the intensity signal output from the light detecting portion to brightness information at each pixel;
a full-scale setting portion that can set, in the information converting portion, a normal full scale that is smaller than the intensity signal of the light from the specimen when given a light stimulus and an expanded full scale that is larger than the normal full scale, as a maximum range of the intensity signal that can be converted to brightness information by the information converting portion;
a switching determination portion that determines whether to switch between a normal observation mode in which the brightness information of the specimen when the light stimulus is not given thereto is obtained and a stimulation observation mode in which the brightness information of the specimen when the light stimulus is given thereto is obtained; and
a setting control portion that controls the full-scale setting portion based on a result of the determination by the switching determination portion so that the normal full scale is set in the normal observation mode, and the expanded full scale is set in the stimulation observation mode.

2. The laser microscope according to claim 1, wherein the information converting portion switches a conversion coefficient for converting the intensity signal to brightness information, between the normal observation mode and the stimulation observation mode.

3. The laser microscope according to claim 1, wherein the information converting portion includes a table in which the intensity signal and the brightness information for the normal observation mode and the stimulation observation mode are associated and converts the intensity signal to the brightness information on the basis of the table.

4. The laser microscope according to claim 1, wherein the maximum range of the expanded full scale is smaller than a maximum value of the intensity signal of the light from the specimen when the light stimulus is given thereto.

5. The laser microscope according to claim 1, wherein the maximum range of the expanded full scale is larger than a maximum value of the intensity signal of the light from the specimen when the light stimulus is given thereto.

6. A laser microscope according to claim 1, wherein the expanded full scale is variable.

7. A laser microscope comprising:
- a light irradiating portion that irradiates a specimen with laser light;
- a light detecting portion that detects light from the specimen irradiated with the laser light by the light irradiating portion and that outputs an intensity signal;
- an information converting portion that converts the intensity signal output from the light detecting portion to brightness information at each pixel with a prescribed first conversion coefficient and that divides the brightness information into two channels;
- a scale-converting portion that converts the brightness information on one of the channels divided by the information converting portion with a prescribed second conversion coefficient that differs from the prescribed first coefficient;
- a channel-information appending portion that attaches different channel information to the brightness information in the two channels;
- a full-scale setting portion that can set, in the information converting portion, a normal full scale that is smaller than the intensity signal of the light from the specimen when given a light stimulus and an expanded full scale that is larger than the normal full scale, as a maximum range of the intensity signal that can be converted to brightness information by the information converting portion;
- a switching determination portion that determines whether to switch between a normal observation mode in which the brightness information of the specimen when the light stimulus is not given thereto is obtained and a stimulation observation mode in which the brightness information of the specimen when the light stimulus is given thereto is obtained; and
- a setting control portion that controls the full-scale setting portion based on a result of the determination by the switching determination portion so that the normal full scale is set in the normal observation mode, and the expanded full scale is set in the stimulation observation mode.

8. The laser microscope according to claim 7, wherein the maximum range of the expanded full scale is smaller than a maximum value of the intensity signal of the light from the specimen when the light stimulus is given thereto.

9. The laser microscope according to claim 7, wherein the maximum range of the expanded full scale is larger than a maximum value of the intensity signal of the light from the specimen when the light stimulus is given thereto.

10. A laser microscope according to claim 7, wherein the expanded full scale is variable.

* * * * *